United States Patent
Yang

(10) Patent No.: US 12,424,002 B2
(45) Date of Patent: Sep. 23, 2025

(54) METHOD AND APPARATUS FOR IMAGE ANNOTATION, AND STORAGE MEDIUM

(71) Applicant: BEIJING BAIDU NETCOM SCIENCE TECHNOLOGY CO., LTD., Beijing (CN)

(72) Inventor: Xue Yang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 458 days.

(21) Appl. No.: 17/855,459

(22) Filed: Jun. 30, 2022

(65) Prior Publication Data

US 2022/0335737 A1 Oct. 20, 2022

(30) Foreign Application Priority Data

Jul. 1, 2021 (CN) .......................... 202110754718.X

(51) Int. Cl.
*G06V 20/70* (2022.01)
*G06V 10/764* (2022.01)

(52) U.S. Cl.
CPC ............ *G06V 20/70* (2022.01); *G06V 10/764* (2022.01)

(58) Field of Classification Search
CPC .... G06V 20/70; G06V 10/764; G06V 10/774; G06V 20/17
See application file for complete search history.

(56) References Cited

U.S. PATENT DOCUMENTS

| | | | | |
|---|---|---|---|---|
| 10,691,943 | B1* | 6/2020 | Ferstl | G06V 20/13 |
| 11,734,827 | B2* | 8/2023 | Bradski | G06T 7/187 |
| | | | | 382/173 |
| 11,741,697 | B2* | 8/2023 | Cha | G06V 10/774 |
| | | | | 382/156 |
| 11,841,922 | B2* | 12/2023 | Lin | G06V 20/70 |
| 12,062,176 | B2* | 8/2024 | Gupta | G06T 11/60 |
| 2015/0186423 | A1* | 7/2015 | Guo | G06F 18/23 |
| | | | | 382/190 |
| 2019/0188848 | A1* | 6/2019 | Madani | G16H 30/40 |
| 2019/0332893 | A1* | 10/2019 | Roy Chowdhury | G06F 18/2163 |

(Continued)

FOREIGN PATENT DOCUMENTS

| | | |
|---|---|---|
| CN | 108463814 A | 8/2018 |
| CN | 110096480 A | 8/2019 |

(Continued)

OTHER PUBLICATIONS

European Search Report for Application No. 22182076.4, dated Nov. 9, 2022, 9 pages.

(Continued)

*Primary Examiner* — Nizar N Sivji
(74) *Attorney, Agent, or Firm* — Lippes Mathias LLP

(57) ABSTRACT

There is provided a method for image annotation, an apparatus for image annotation, and a storage medium. The method includes: obtaining annotation contents of an image to be annotated; determining an association relationship among the annotation contents, in which the association relationship includes at least one of a series relationship and a parallel relationship; and performing distribution and annotation on the image to be annotated according to the annotation contents and the association relationship.

11 Claims, 4 Drawing Sheets

(56) References Cited

U.S. PATENT DOCUMENTS

2020/0397346 A1    12/2020  Nakajima
2021/0209765 A1*    7/2021  Yang ..................... G06V 20/10
2022/0319043 A1*   10/2022  Chandler ................. G06T 7/70
2024/0185544 A1*    6/2024  Schubert .................. G06T 5/70

FOREIGN PATENT DOCUMENTS

CN    111860304 A    10/2020
CN    112256939 A     1/2021
CN    112269862 A     1/2021
CN    112884303 A     6/2021

OTHER PUBLICATIONS

Bryan C. Russell et al., "LabelMe: A Database and Web-Based Tool for Image Annotation", Int. J. Comput Vis (2008), Oct. 31, 2007, 17 pages.

Office Action for Chinese Application No. 202110754718.X, dated May 20, 2022, 8 pages.

Liang-Tien Chea et al., "Concurrent Single-Label Image Classification and Annotation via Efficient Multi-Layer Group Sparse Coding", IEEE Transaction on Multimedia, vol. 16, No. 3, Apr. 2014, 11 pages.

Zhou Hangchi, "Research on Image Classification and annotation based on deep learning", Full Text Database of Chinese Excellent Master's Dissertations, Electronic Journals Information Science, Jul. 2020, 68 pages.

* cited by examiner

METHOD AND APPARATUS FOR IMAGE ANNOTATION, AND STORAGE MEDIUM

CROSS REFERENCE TO RELATED APPLICATION

This application is based on and claims priority to Chinese Patent Application No. 202110754718.X, filed on Jul. 1, 2021, the entire content of which is hereby incorporated by reference.

TECHNICAL FIELD

The disclosure relates to the field of computer technologies, and in particular to a method for image annotation, an apparatus for image annotation, and a storage medium.

BACKGROUND

With development of artificial intelligence (AI) technologies, image annotation has been widely used in the field of obstacle annotation and skeleton key-point annotation in an unmanned vehicle scene. For example, in the obstacle annotation of the unmanned vehicle scene, attributes such as a capturing time, a type of an annotation box, a location, a shelter, and a truncation of an image acquired by an unmanned vehicle can be annotated.

SUMMARY

Embodiments of the disclosure provide a method for image annotation, an apparatus for image annotation, and a storage medium.

According to a first aspect of the disclosure, a method for image annotation is provided. The method includes: obtaining annotation contents of an image to be annotated; determining an association relationship among the annotation contents, in which the association relationship includes at least one of a series relationship and a parallel relationship; and performing distribution and annotation on the image to be annotated according to the annotation contents and the association relationship.

According to a second aspect of the disclosure, an apparatus for image annotation is provided. The apparatus includes at least one processor and a memory communicatively coupled to the at least one processor. The memory is configured to store instructions executable by the at least one processor. When executing the instructions, the at least one processor is configured to: obtain annotation contents of an image to be annotated; determine an association relationship among the annotation contents, in which the association relationship includes at least one of a series relationship and a parallel relationship; perform distribution and annotation on the image to be annotated according to the annotation contents and the association relationship.

According to a third aspect of the disclosure, a non-transitory computer-readable storage medium having computer instructions stored thereon is provided. The computer instructions are configured to cause a computer to implement a method for image annotation. The method includes: obtaining annotation contents of an image to be annotated; determining an association relationship among the annotation contents, in which the association relationship includes at least one of a series relationship and a parallel relationship; and performing distribution and annotation on the image to be annotated according to the annotation contents and the association relationship.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Artificial intelligence AI is a technical science that studies and develops theories, methods, technologies and application systems for simulating, extending and expanding human intelligence. Currently, AI technology has been widely applied due to the advantages of high automation degree, high accuracy and low cost.

Computer vision refers to machine vision using cameras and computers instead of human eyes to recognize, track and measure objects and performs graphic processing, in order to make the objects processed by the computers into an image more suitable for observing by human eyes or transmitting to instruments for inspection. The computer vision is a comprehensive discipline that includes computer science and engineering, signal processing, physics, applied mathematics and statistics, neurophysiology, and cognitive science.

Image processing is a technique of analyzing an image with a computer to achieve a desired result, which generally refers to digital image processing. A digital image is a large two-dimensional array obtained by capturing with industrial cameras, video cameras, scanners and other devices. Elements of this array are called pixels and values of the pixels are called gray-scale values. Image processing techniques generally include 3 parts: image compression, enhancement and restoration, matching, description and recognition.

Data annotation is an act of processing AI learning data by data processors with the help of annotation tools and includes operations of categorizing, organizing, editing, correcting errors, tagging and remarking data to be annotated such as text, image, speech and video, to add labels to the data to be annotated to generate machine-readable data codes that meet machine learning training requirements. Generally, types of the data annotation include: image annotation, speech annotation, text annotation, and video annotation. Basic forms of the annotation include annotation boxes, 3D boxes, text transcription, image dotting, and contours of target objects.

Figure 1:
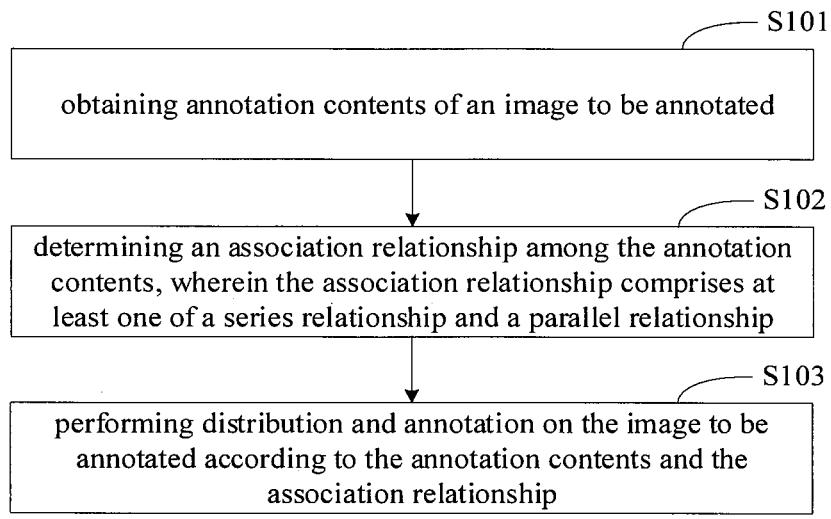
FIG. 1 is a flowchart illustrating a method for image annotation according to a first embodiment of the disclosure.

FIG. 1 is a flowchart illustrating a method for image annotation according to a first embodiment of the disclosure.

As illustrated in FIG. 1, the method for image annotation according to the first embodiment of the disclosure includes the following blocks.

In block S101, annotation contents of an image to be annotated are obtained.

It is noted that an execution subject of the method for image annotation of embodiments of the disclosure may be a hardware device having data information processing capabilities and/or software necessary to drive the hardware device to work. Optionally, the execution subject may include a workstation, a server, a computing device, a user terminal, and other intelligent devices. The user terminal includes, but is not limited to, a cell phone, a computer, an intelligent voice interaction device, a smart home appliance, and a vehicle-mounted terminal.

In embodiments of the disclosure, the annotation contents of the image to be annotated may be obtained.

It is noted that an annotation classification of the annotation content is not overly limited in embodiments of the disclosure.

In an embodiment, the annotation classification of the annotation content includes, but is not limited to, image, element position, element attribute and the like. The elements include, but are not limited to, dot element, line element, region element, and box element.

The annotation content with the image as the annotation classification includes, but is not limited to, whether the image is clear, whether a capturing scene of the image meets requirements, whether the image is annotatable, whether the image is captured in daytime or at night.

The annotation content with the element position as the annotation classification includes, but is not limited to, dotting, marking with a line, marking with a box and marking with a region on the image.

The annotation content with the element attribute as the annotation classification includes, but is not limited to, a vehicle type of a target to be labeled, a name of a lane where the vehicle is located, whether a region element is sky or land.

In block S102, an association relationship among the annotation contents is determined. The association relationship includes at least one of a series relationship and a parallel relationship.

In an embodiment of the disclosure, there is the association relationship among the annotation contents. The association relationship includes the at least one of the series relationship and the parallel relationship.

For example, the annotation contents A, B, C and D are a vehicle type of a target to be labeled, whether the image is clear, dotting on the image and marking with a line on the image, respectively. The association relationship between the annotation contents C and D may be determined as the parallel relationship, and the association relationship among the annotation contents A, B, and C may be determined as the series relationship. In the series relationship, an annotation time of the annotation content B is earlier than an annotation time of the annotation content C, and an annotation time of the annotation content C is earlier than an annotation time of the annotation content A.

In an embodiment, a mapping relationship or a mapping table between the annotation contents and the association relationship may be pre-established. After the annotation contents are obtained, the mapping relationship or the mapping table may be queried to obtain the association relationship corresponding to the obtained annotation contents. For example, the association relationship between dotting on the image and marking with a line on the image may be preset as the parallel relationship, and this relationship is stored in the mapping relationship or the mapping table.

In block S103, distribution and annotation is performed on the image to be annotated according to the annotation contents and the association relationship.

In an embodiment of the disclosure, the distribution and annotation may be performed on the image to be annotated according to the annotation contents and the association relationship. For example, a distribution strategy may be determined according to the annotation contents and the association relationship, and the distribution and annotation is performed on the image to be annotated according to the distribution strategy. The distribution strategy may include annotation objects that are distributed to and the annotation contents that are to be annotated by the annotation objects. The annotation objects may be annotators.

For example, the annotation contents A, B, C and D are the vehicle type of the target to be labeled, whether the image is clear, dotting on the image and marking with a line on the image, respectively. The association relationship between the annotation contents C and D is the parallel relationship, and the association relationship among the annotation contents A, B and C is the series relationship, the image to be annotated may be distributed to annotation object 1 for annotating with the annotation content B. After annotating with the annotation content B is completed, the image to be annotated carrying an annotation result of the annotation content B is distributed to annotation objects 2 and 3 for annotating with the annotation contents C and D respectively. After annotating with the annotation contents C and D is completed, the image to be annotated carrying an annotation result of the annotation contents B, C, and D is distributed to annotation object 4 for annotating with the annotation content A.

In conclusion, according to the method for image annotation of embodiments of the disclosure, the association relationship among the annotation contents is determined, and the association relationship includes the at least one of the series relationship and the parallel relationship. The distribution and annotation is performed on the image to be annotated according to the annotation contents and the association relationship. Therefore, it is helpful to improve accuracy and reliability of the distribution and annotation for the image by taking an influence of the annotation contents and the association relationship on the distribution and annotation for the image into consideration.

Figure 2:
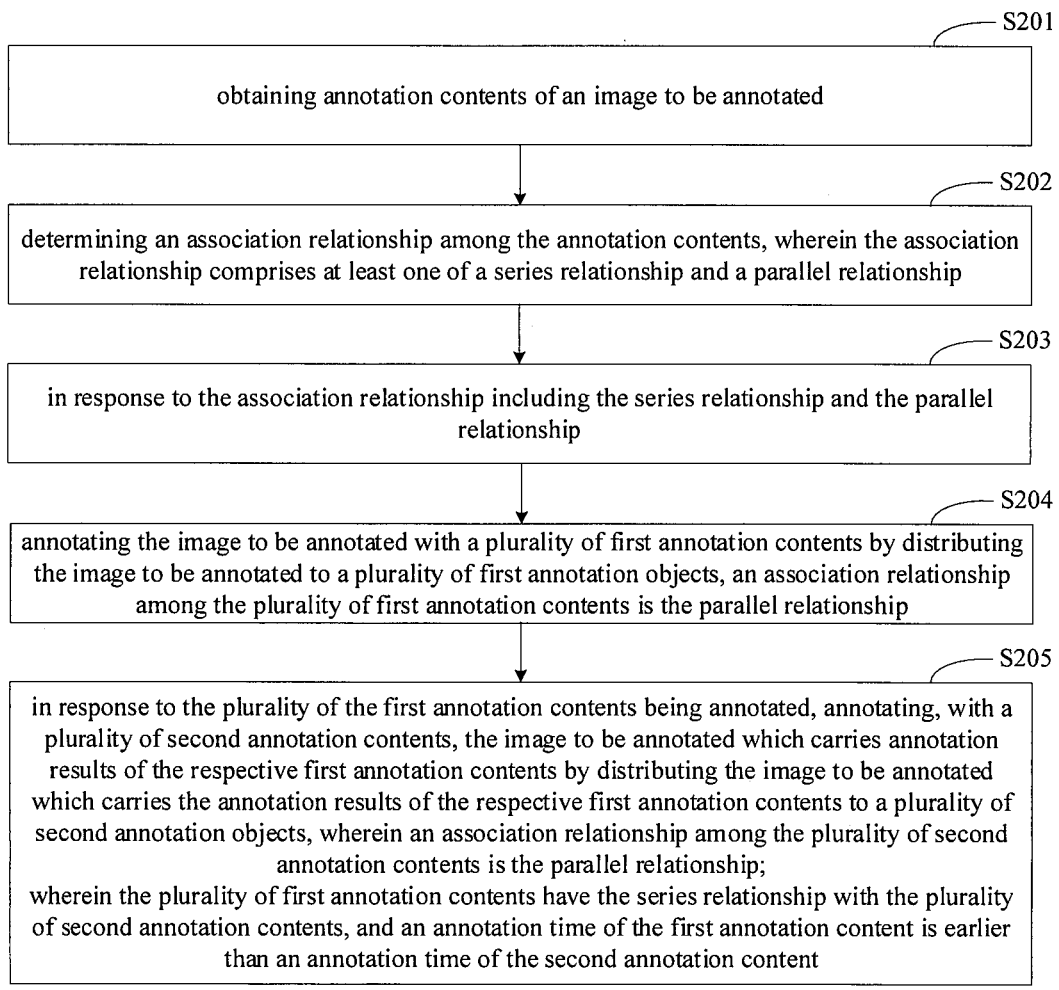
FIG. 2 is a flowchart illustrating a method for image annotation according to a second embodiment of the disclosure.

FIG. 2 is a flowchart illustrating a method for image annotation according to a second embodiment of the disclosure.

As illustrated in FIG. 2, the method for image annotation according to a second embodiment of the disclosure includes the following blocks.

In block S201, annotation contents of an image to be annotated are obtained.

In block S202, an association relationship among the annotation contents is determined, the association relationship includes at least one of a series relationship and a parallel relationship.

For the relevant content of blocks S201-S202, reference may be made to the foregoing embodiments, and details are not repeated here.

In block S203, it is determined that the association relationship includes the series relationship and the parallel relationship.

In block S204, the image to be annotated is annotated with a plurality of first annotation contents by distributing the image to be annotated to a plurality of first annotation objects. An association relationship among the plurality of first annotation contents is the parallel relationship.

In block S205, in response to the plurality of the first annotation contents being annotated, the image to be annotated which carries annotation results of the respective first annotation contents is annotated with a plurality of second annotation contents by distributing the image to be annotated which carries the annotation results of the respective first annotation contents to a plurality of second annotation objects. An association relationship among the plurality of second annotation contents is the parallel relationship. The plurality of first annotation contents have the series relationship with the plurality of second annotation contents, and an annotation time of the first annotation content is earlier than an annotation time of the second annotation content.

In an embodiment of the disclosure, the determined association relationship between the annotation contents may include the series relationship and the parallel relationship. The annotation content includes the plurality of first annotation contents and the plurality of second annotation contents. The association relationship between the first annotation content and the second annotation content is the series relationship, and the annotation time of the first annotation content is earlier than the annotation time of the second annotation content. The association relationship among the plurality of first annotation contents is the parallel relationship, and the association relationship among the plurality of second annotation contents is the parallel relationship.

In an embodiment of the disclosure, the image to be annotated may be distributed to the plurality of first annotation objects to annotate with the plurality of first annotation contents. That is, the plurality of first annotation contents may be annotated in parallel. When each of the plurality of the first annotation contents are annotated, the image to be annotated carrying the annotation results of the respective first annotation contents may be distributed to a plurality of second annotation objects to annotate with a plurality of second annotation contents, that is, the plurality of second annotation contents may be annotated in parallel, and the plurality of first annotation contents may be annotated in serial with the plurality of second annotation contents.

For example, in a case the first annotation contents include dotting and marking with a line on the image and the second annotation contents include a vehicle type of the target to be labeled, and a name of a lane where the target to be labeled is located, the image to be annotated may be distributed to the plurality of first annotation objects for dotting and marking with the line on the image. After dotting and marking with the line on the image is completed, the image to be annotated carrying an annotation result of dotting and marking with a line may be distributed to the plurality of second annotation objects to annotate with the vehicle type of the target to be labeled and the name of the lane where the target to be labeled is located.

In conclusion, according to the method for image annotation of embodiments of the disclosure, in response to the association relationship including the series relationship and the parallel relationship, the plurality of first annotation contents may be annotated in parallel, and the plurality of second annotation contents may be annotated in parallel, so as to improve efficiency of the image annotation. The first annotation contents may be annotated in series with the second annotation contents, therefore, in a process of annotating the second annotation contents with a later annotation time, the annotation result of the first annotation contents with an earlier annotation time may be verified, which is helpful to improve a quality of the image annotation.

Figure 3:
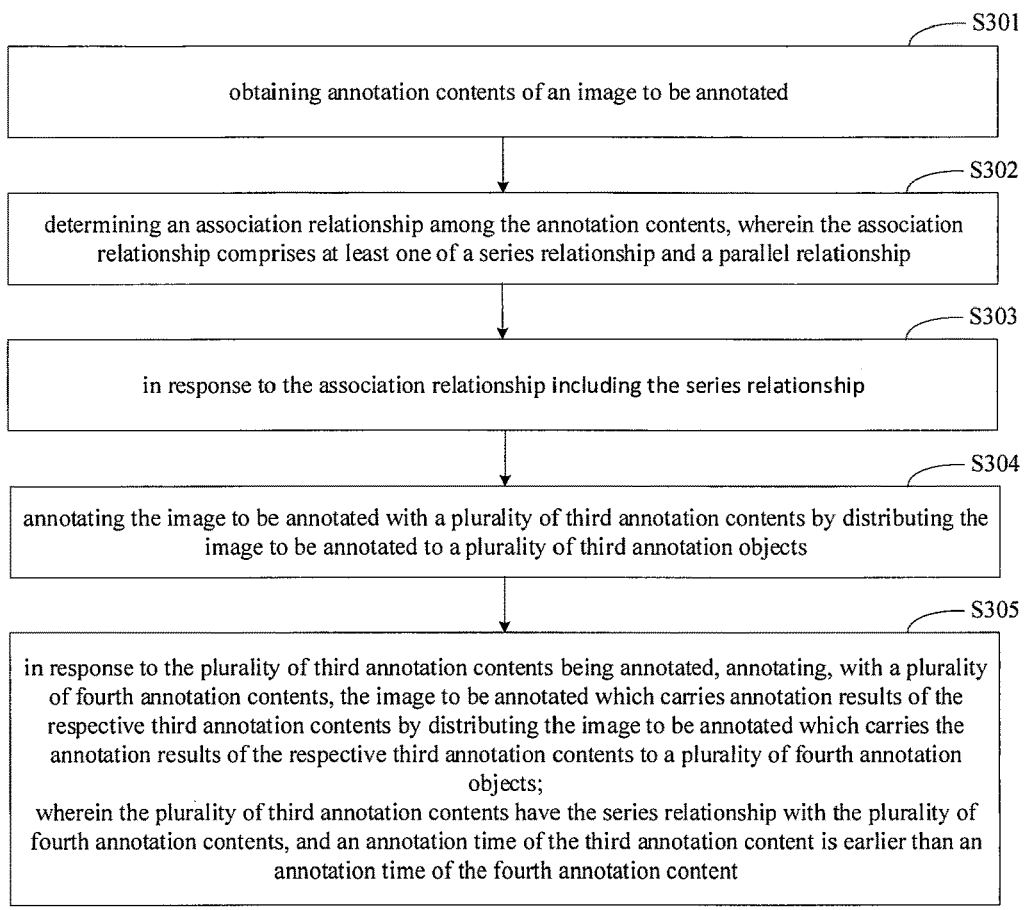
FIG. 3 is a flowchart illustrating a method for image annotation according to a third embodiment of the disclosure.

FIG. 3 is a flowchart illustrating a method for image annotation according to a third embodiment of the disclosure.

As illustrated in FIG. 3, the method for image annotation according to the third embodiment of the disclosure includes the following blocks.

In block S301, annotation contents of an image to be annotated are obtained.

In block S302, an association relationship among the annotation contents is determined. The association relationship includes at least one of a series relationship and a parallel relationship.

For the relevant content of blocks S301-S302, reference may be made to the foregoing embodiments, and details are not repeated here.

In block S303, it is determined that the association relationship includes the series relationship.

In block S304, the image to be annotated is annotated with a plurality of third annotation contents by distributing the image to be annotated to a plurality of third annotation objects.

In block S305, in response to the plurality of third annotation contents being annotated, the image to be annotated which carries annotation results of the respective third annotation contents is annotated with a plurality of fourth annotation contents by distributing the image to be annotated which carries the annotation results of the respective third annotation contents to a plurality of fourth annotation objects. The plurality of third annotation contents have the series relationship with the plurality of fourth annotation contents, and an annotation time of the third annotation content is earlier than an annotation time of the fourth annotation content.

In an embodiment of the disclosure, the determined association relationship among the annotation contents is the series relationship, the annotation contents include the third annotation contents and the fourth annotation contents, the association relationship between the third annotation content and the fourth annotation content is the series relationship, and the annotation time of the third annotation content is earlier than the annotation time of the fourth annotation content.

In an embodiment of the disclosure, the image to be annotated may be distributed to the plurality of third annotation objects to annotate with the third annotation contents, and when each of the plurality of third annotation contents is annotated, the image to be annotated carrying the annotation results of the respective third annotation contents may be distributed to the plurality of fourth annotation objects to annotate with the fourth annotation contents. That is, the third annotation contents may be annotated in series with the fourth annotation contents.

For example, in a case that the third annotation content includes dotting on the image and the fourth annotation content includes a vehicle type of a target to be labeled, the image to be annotated may be distributed to the third annotation objects to annotate with dotting on the image. After the annotation of dotting on the image is completed, the image to be annotated carrying an annotation result of dotting may be distributed to the fourth annotation objects to annotate with the vehicle type of the target to be labeled.

In conclusion, according to the method for image annotation according to embodiments of the disclosure, in response to the association relationship including the series relationship, the third annotation contents may be annotated in series with the fourth annotation contents, therefore, in a process of annotating the fourth annotation content with the later annotation time, the annotation results of the third annotation content with the earlier annotation time may be verified, which is helpful to improve a quality of image annotation.

Figure 4:
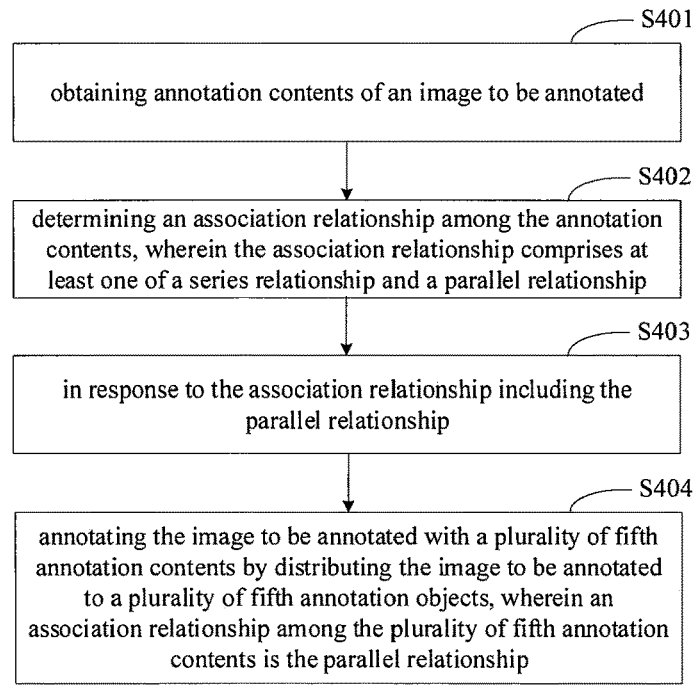
FIG. 4 is a flowchart illustrating a method for image annotation according to a fourth embodiment of the disclosure.

FIG. 4 is a flowchart illustrating a method for image annotation according to a fourth embodiment of the disclosure.

As illustrated in FIG. 4, the method for image annotation according to a fourth embodiment of the disclosure includes the following blocks.

In block S401, annotation contents of an image to be annotated are obtained.

In block S402, an association relationship among the annotation contents is determined, and the association relationship includes at least one of a series relationship and a parallel relationship.

For the relevant content of blocks S401-S402, reference may be made to the foregoing embodiments, which will not be repeated here.

In block S403, it is determined that the association relationship includes the parallel relationship.

In block S404, the image to be annotated is annotated with a plurality of fifth annotation contents by distributing the image to be annotated to a plurality of fifth annotation objects, and an association relationship among the plurality of fifth annotation contents is the parallel relationship.

In an embodiment of the disclosure, the determined association relationship among the annotation contents is the parallel relationship, the annotation contents include the plurality of fifth annotation contents, and the association relationship among the plurality of fifth annotation contents is the parallel relationship.

In an embodiment of the disclosure, the image to be annotated is distributed to the plurality of fifth annotation objects to annotate with the plurality of fifth annotation contents. The association relationship among the plurality of fifth annotation contents is the parallel relationship.

For example, in a case that the fifth annotation contents include dotting, marking with a line and marking with a region on the image, the image to be annotated may be distributed to the plurality of fifth annotation objects for dotting, marking with the line and marking with the region on the image.

In conclusion, according to the method for image annotation according to embodiments of the disclosure, in response to the association relationship including the parallel relationship, the fifth annotation contents may be annotated in parallel, thereby improving an efficiency of the image annotation.

Figure 5:
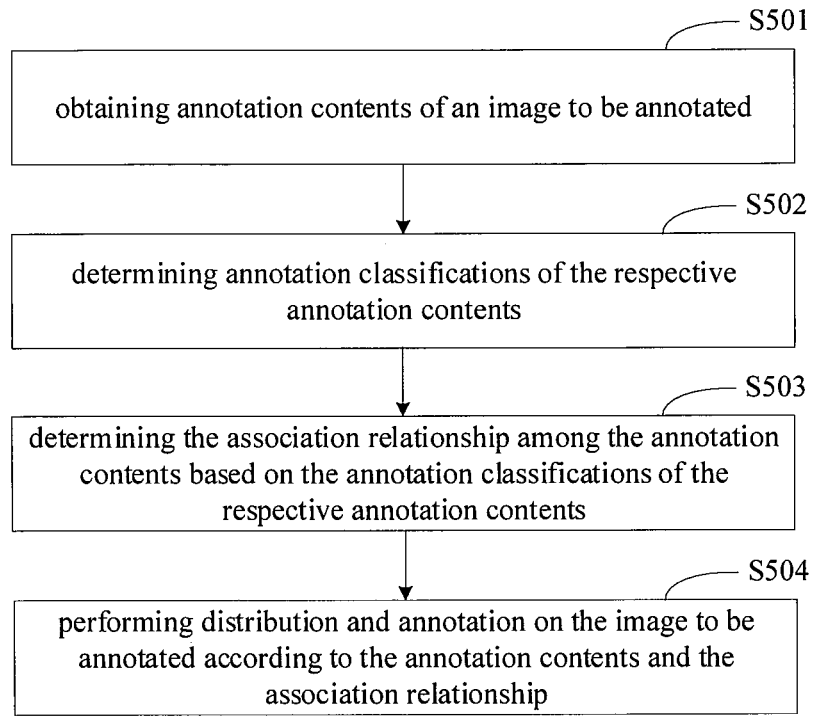
FIG. 5 is a flowchart illustrating a method for image annotation according to a fifth embodiment of the disclosure.

FIG. 5 is a flowchart illustrating a method for image annotation according to a fifth embodiment of the disclosure.

As illustrated in FIG. 5, the method for image annotation according to a fifth embodiment of the disclosure includes the following blocks.

In block S501, annotation contents of an image to be annotated are obtained.

For the relevant content of block S501, reference may be made to the foregoing embodiment, and details are not repeated here.

In block S502, annotation classifications of the respective annotation contents are determined.

In an embodiment, determining the annotation classification of the annotation content may include extracting a keyword from the annotation content, and determining the annotation classification of the annotation content based on the keyword.

For example, when the annotation content is whether the image is clear, the keyword may be extracted as image, and the corresponding annotation classification may be determined as image. When the annotation content is dotting on the image, the keyword may be extracted as dotting, and the annotation classification may be determined as element position. When the annotation content is a vehicle type of a target to be labeled, the keyword may be extracted as the vehicle type, and the annotation classification is determined as element attribute.

In block S503, the association relationship among the annotation contents is determined based on the annotation classifications of the respective annotation contents.

In an embodiment, a mapping relationship or a mapping table between the annotation classifications of the annotation contents and the association relationship may be pre-established. After the annotation classifications of the annotation contents are obtained, the mapping relationship or the mapping table may be queried to obtain the association relationship corresponding to the annotation contents. For example, the association relationship between the annotation classification of dotting on the image and the annotation classification of marking with a line on the image may be preset as the parallel relationship, and this relationship may be stored in the mapping relationship or the mapping table. It should be noted that, the above mapping relationship or the mapping table may be preset according to actual situations, which is not limited here.

In an embodiment, determining the association relationship between the annotation contents based on the annotation classifications of the annotation contents may include the following six possible implementations.

In a first implementation, in response to the annotation classifications of any two annotation contents being element position, the association relationship between the two annotation contents is determined as the parallel relationship.

For example, when the annotation contents A and B are dotting and marking with a line on the image respectively, and the annotation classifications of the annotation contents A and B both are the element position, the association relationship between the annotation contents A and B is determined as the parallel relationship.

In a second implementation, in response to the annotation classifications of any two annotation contents being element attribute the association relationship between the two annotation contents is determined as the parallel relationship.

For example, when the annotation contents A and B are a vehicle type of the target to be labeled and a name of a lane where the target to be labeled is located respectively, and the annotation classifications of the annotation contents A and B both are the element attribute, the association relationship between the annotation contents A and B is determined as the parallel relationship.

In a third implementation, it is determined that the annotation content with the element position as the annotation classification has the series relationship with the annotation content with the element attribute as the annotation classification.

For example, when the annotation contents A and B are dotting on the image and the vehicle type of the target to be labeled, and the annotation classifications of the annotation contents A and B are the element position and the element attribute, respectively, the association relationship between the annotation contents A and B is determined as the series relationship.

In a fourth implementation, in response to the annotation classifications of any two annotation contents being image, the association relationship between the two annotation contents is determined as the parallel relationship.

For example, when the annotation contents A and B are whether the image is clear and whether the image was taken in the daylight or at night, respectively, and the annotation classifications of the annotation contents A and B both are the image, the association relationship between the annotation contents A and B may be determined as the parallel relationship.

In a fifth implementation, it is determined that the annotation content with the image as the annotation classification has the series relationship with the annotation content with the element position as the annotation classification.

For example, when the annotation contents A and B are whether the image is clear and marking with the line on the image, and the annotation classifications of the annotation contents A and B are the image and the element position respectively, and the association relationship between the annotation contents A and B may be determined as the series relationship.

In a sixth implementation, it is determined that the annotation content with the image as the annotation classification has the series relationship with the annotation content with the element attribute as the annotation classification.

For example, when the annotation contents A and B are whether the image is clear and the vehicle type of the target to be labeled respectively, and the annotation classifications of the annotation contents A and B are the image and the element attribute respectively, the association relationship between the annotation contents A and B may be determined as the series relationship.

In block S504, distribution and annotation are performed on the image to be annotated according to the annotation contents and the association relationship.

For the relevant content of block S504, reference may be made to the foregoing embodiments, and details are not repeated here.

In conclusion, according to the method for image annotation of embodiments of the disclosure, the association relationship among the annotation contents may be determined based on the annotation classifications of the annotation contents, and the association relationship is matched with the annotation classifications of the annotation contents. Therefore, the association relationship is more accurate and flexible.

Figure 6:
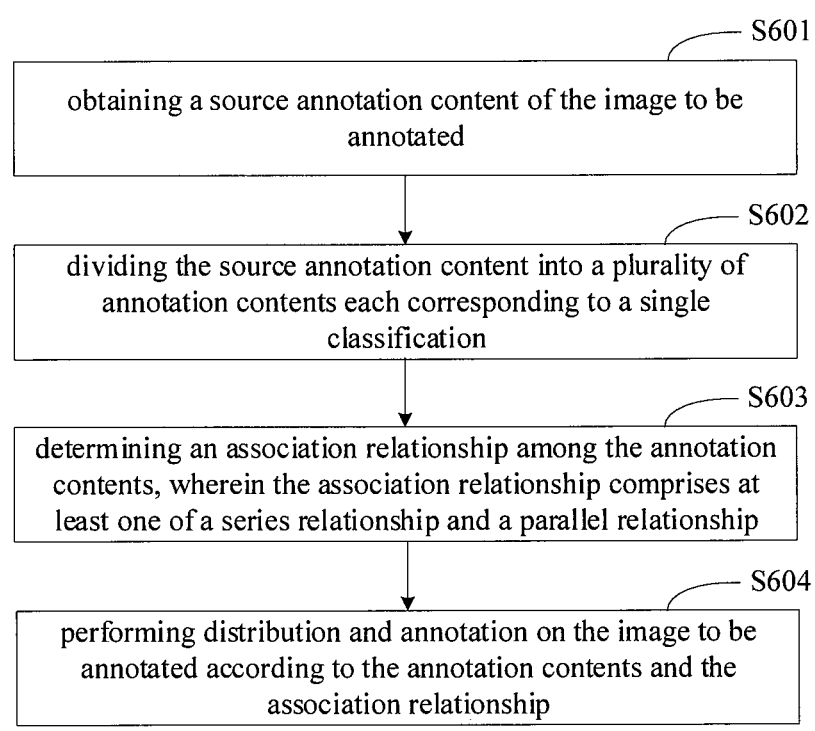
FIG. 6 is a flowchart illustrating a method for image annotation according to a sixth embodiment of the disclosure.

FIG. 6 is a flowchart illustrating a method for image annotation according to a sixth embodiment of the disclosure.

As illustrated in FIG. 6, the method for image annotation according to a sixth embodiment of the disclosure includes the following blocks.

In block S601, a source annotation content of the image to be annotated is obtained.

In an embodiment of the disclosure, the source annotation content refers to the annotation content that has not been divided, and the source annotation content may have a plurality of annotation classifications. For example, source annotation content Q may include dotting on the image, marking with a line on the image, a vehicle type of a target to be labeled, a name of a lane where the vehicle is located, and the annotation classifications corresponding the annotation content Q include element position and element attribute.

In block S602, the source annotation content is divided into a plurality of annotation contents each corresponding to a single classification.

In an embodiment of the disclosure, the source annotation content may be divided to generate the plurality of annotation contents each corresponding to a single classification, that is, a number of the annotation classification of each annotation content after the dividing is 1.

For example, when the source annotation content Q includes dotting on the image, marking with the line on the image, the vehicle type of the target to be labeled, and the name of the lane where the vehicle is located, then the source annotation content Q may be divided into annotation contents A, B, C and D (as described above), and the annotation contents A, B, C and D are dotting on the image, marking with the line on the image, the vehicle type of the target to be labeled, and the name of the lane where the target to be labeled is located.

In block S603, an association relationship among the annotation contents is determined, the association relationship includes at least one of a series relationship and a parallel relationship.

In block S604, distribution and annotation are performed on the image to be annotated according to the annotation contents and the association relationship.

For the related content of blocks S603-S604, reference may be made to the above embodiments, and details are not described herein again.

In conclusion, according to the method for image annotation of the embodiments of the disclosure, the source annotation content may be divided to generate the plurality of annotation contents each corresponding to a single classification. In this way, automatic dividing of the annotation contents may be realized, and the plurality of annotation contents each corresponding to a single classification may be annotated, which reduces difficulty of the image annotation.

On the basis of any of the above embodiments, performing the distribution and annotation on the image to be annotated according to the annotation contents and the association relationship includes: selecting the annotation objects matching the annotation contents from candidate annotation objects according to the annotation content; distributing the image to be annotated to the annotation objects for annotation; and generating annotation results of the annotation contents.

For example, the candidate annotation objects include candidate annotation objects 1 to 10, the candidate annotation objects 1 to 3 may annotate the annotation content with the image as the annotation classification, the candidate annotation objects 4 to 7 may annotate the annotation content with the element position as the annotation classification, and the candidate annotation objects 8 to 10 may annotate the annotation content with the element attribute as the annotation classification. When the annotation classification of the annotation content includes the element position, the image to be annotated may be distributed to at least one of the candidate annotation objects 4 to 7 for annotating the element position.

Figure 7:
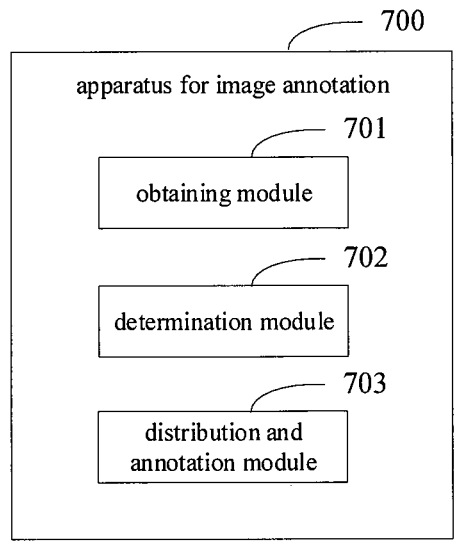
FIG. 7 is a block diagram illustrating an apparatus for image annotation according to a seventh embodiment of the disclosure.

FIG. 7 is a block diagram of an image labeling apparatus according to a seventh embodiment of the disclosure.

As illustrated in FIG. 7, an image labeling apparatus 700 according to a seventh embodiment of the disclosure includes an obtaining module 701, a determination module 702 and a distribution and annotation module 703.

The obtaining module 701 is configured to obtain annotation contents of an image to be annotated.

The determination module 702 is configured to determine an association relationship among the annotation contents. The association relationship includes at least one of a series relationship and a parallel relationship.

The distribution and annotation module 703 is configured to perform distribution and annotation on the image to be annotated according to the annotation contents and the association relationship.

In an embodiment of the disclosure, the association relationship includes the series relationship and the parallel relationship, and the distribution and annotation module 703 is further configured to:

annotate the image to be annotated with a plurality of first annotation contents by distributing the image to be annotated to a plurality of first annotation objects, in which an association relationship among the plurality of first annotation contents is the parallel relationship;

in response to the plurality of the first annotation contents being annotated, annotate, with a plurality of second annotation contents, the image to be annotated which carries annotation results of the respective first annotation contents by distributing the image to be annotated which carries the annotation results of the respective first annotation contents to a plurality of second annotation objects, in which an association relationship among the plurality of second annotation contents is the parallel relationship.

The plurality of first annotation contents have the series relationship with the plurality of second annotation contents, and an annotation time of the first annotation content is earlier than an annotation time of the second annotation content.

In an embodiment of the disclosure, the association relationship includes the series relationship, and the distribution and annotation module 703 is further configured to:

annotate the image to be annotated with a plurality of third annotation contents by distributing the image to be annotated to a plurality of third annotation objects;

in response to the plurality of third annotation contents being annotated, annotate, with a plurality of fourth annotation contents, the image to be annotated which carries annotation results of the respective third annotation contents by distributing the image to be annotated which carries the annotation results of the respective third annotation contents to a plurality of fourth annotation objects.

The plurality of third annotation contents have the series relationship with the plurality of fourth annotation contents, and an annotation time of the third annotation content is earlier than an annotation time of the fourth annotation content.

In an embodiment of the disclosure, the association relationship includes the parallel relationship, and the distribution and annotation module 703 is further configured to:

annotate the image to be annotated with a plurality of fifth annotation contents by distributing the image to be annotated to a plurality of fifth annotation objects, in which an association relationship among the plurality of fifth annotation contents is the parallel relationship.

In an embodiment of the disclosure, the determination module 702 is further configured to:

determine an annotation classification of the respective annotation contents; and determine the association relationship among the annotation contents based on the annotation classifications of the respective annotation contents.

In an embodiment of the disclosure, the determination module 702 is further configured to:

in response to the annotation classifications of any two annotation contents being element position, determine that the association relationship between the two annotation contents is the parallel relationship; or, in response to the annotation classifications of any two annotation contents being element attribute, determine that the association relationship between the two annotation contents is the parallel relationship; or, determine that the annotation content with the element position as the annotation classification has the series relationship with the annotation content with the element attribute as the annotation classification.

In an embodiment of the disclosure, the determination module 702 is further configured to:

in response to the annotation classifications of any two annotation contents being image, determine that the association relationship between the two annotation contents is the parallel relationship; or, determine that the annotation content with the image as the annotation classification has the series relationship with the annotation content with the element position as the annotation classification; or determine that the annotation content with the image as the annotation classification has the series relationship with the annotation content with the element attribute as the annotation classification.

In an embodiment of the disclosure, the obtaining module 701 is further configured to:

obtain a source annotation content of the image to be annotated; and divide the source annotation content into a plurality of annotation contents each corresponding to a single classification.

In conclusion, according to the apparatus for image annotation in embodiments of the disclosure, the association relationship among the annotation contents is determined, in which the association relationship includes at least one of the series relationship and the parallel relationship. The distribution and annotation are performed on the image to be annotated according to the annotation contents and the association relationship. Therefore, it is helpful to improve accuracy and reliability of the distribution and annotation for the image by taking an influence of the annotation contents and the association relationship on the distribution and annotation for the image into consideration.

In the technical solution of the disclosure, acquisition, storage, and application of user personal information involved all comply with the provisions of relevant laws and regulations, and do not violate public order and good customs.

According to the embodiments of the disclosure, the disclosure also provides an electronic device, a readable storage medium and a computer program product.

Figure 8:
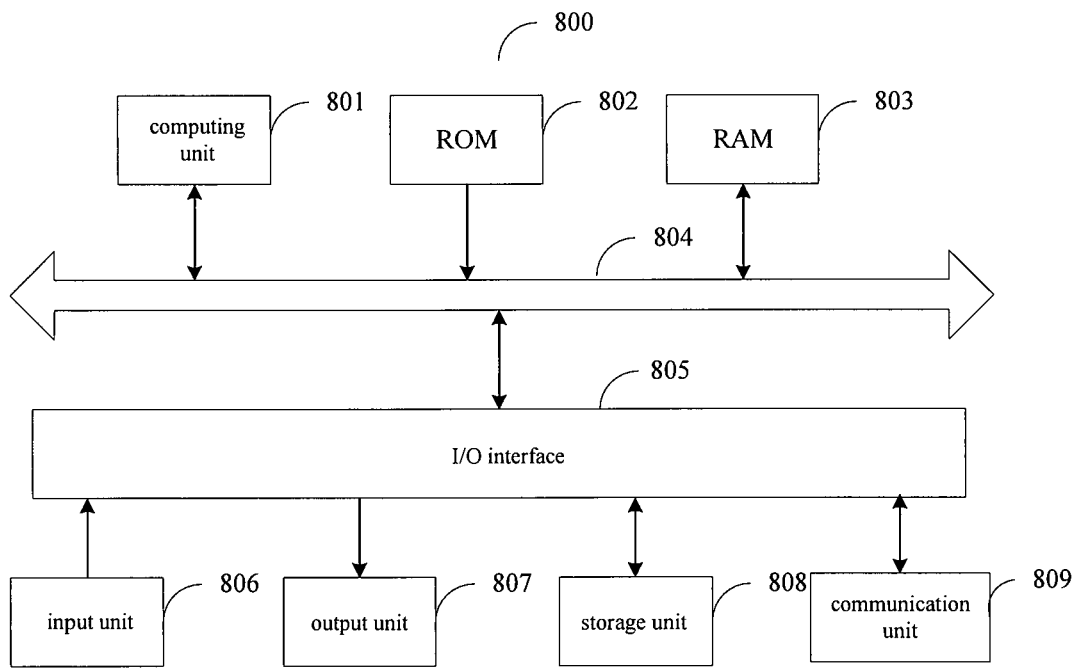
FIG. 8 is a block diagram illustrating an electronic device configured to implement a method for image annotation according to embodiments of the disclosure.

FIG. 8 is a block diagram of an example electronic device 800 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the device 800 includes a computing unit 801 performing various appropriate actions and processes based on computer programs stored in a read-only memory (ROM) 802 or computer programs loaded from the storage unit 808 to a random access memory (RAM) 803. In the RAM 803, various programs and data required for the operation of the device 800 are stored. The computing unit 801, the ROM 802, and the RAM 803 are connected to each other through a bus 804. An input/output (I/O) interface 805 is also connected to the bus 804.

Components in the device 800 are connected to the I/O interface 805, including: an inputting unit 806, such as a keyboard, a mouse; an outputting unit 807, such as various types of displays, speakers; a storage unit 808, such as a disk, an optical disk; and a communication unit 809, such as network cards, modems, and wireless communication transceivers. The communication unit 809 allows the device 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 801 executes the various methods and processes described above, such as the method for image annotation. For example, in some embodiments, the method may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded on the RAM 803 and executed by the computing unit 801, one or more steps of the method described above may be executed. Alternatively, in other embodiments, the computing unit 801 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server can be a cloud server, a distributed system server, or a server combined with a block-chain.

According to the embodiment of the disclosure, the disclosure further provides a computer program product including a computer program. When the computer program is executed by a processor, the method for image annotation described in the above embodiments of the disclosure is implemented.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for image annotation, comprising:
    obtaining annotation contents of an image to be annotated;
    determining an association relationship among the annotation contents; and
    performing distribution and annotation on the image to be annotated according to the annotation contents and the association relationship;
    wherein the association relationship comprises a series relationship and a parallel relationship, and performing the distribution and annotation on the image to be annotated according to the annotation contents and the association relationship comprises:
    annotating the image to be annotated with a plurality of first annotation contents by distributing the image to be annotated to a plurality of first annotation objects, wherein an association relationship among the plurality of first annotation contents is the parallel relationship;
    in response to the plurality of the first annotation contents being annotated, annotating, with a plurality of second annotation contents, the image to be annotated which carries annotation results of the respective first annotation contents by distributing the image to be annotated which carries the annotation results of the respective first annotation contents to a plurality of second annotation objects, wherein an association relationship among the plurality of second annotation contents is the parallel relationship;
    wherein the plurality of first annotation contents have the series relationship with the plurality of second annotation contents, and an annotation time of the first annotation content is earlier than an annotation time of the second annotation content.

2. The method of claim 1, wherein determining the association relationship among the annotation contents comprises:
    determining annotation classifications of the respective annotation contents; and
    determining the association relationship among the annotation contents based on the annotation classifications of the respective annotation contents.

3. The method of claim 2, wherein determining the association relationship among the annotation contents based on the annotation classifications of the respective annotation contents comprises:
    in response to the annotation classifications of any two annotation contents being element position, determining that the association relationship between the two annotation contents is the parallel relationship; or,
    in response to the annotation classifications of any two annotation contents being element attribute, determining that the association relationship between the two annotation contents is the parallel relationship; or,
    determining that the annotation content with the element position as the annotation classification has the series relationship with the annotation content with the element attribute as the annotation classification.

4. The method of claim 3, further comprising:
    in response to the annotation classifications of any two annotation contents being image, determining that the association relationship between the two annotation contents is the parallel relationship; or,
    determining that the annotation content with the image as the annotation classification has the series relationship with the annotation content with the element position as the annotation classification; or
    determining that the annotation content with the image as the annotation classification has the series relationship with the annotation content with the element attribute as the annotation classification.

5. The method of claim 1, wherein obtaining the annotation contents of the image to be annotated comprises:
    obtaining a source annotation content of the image to be annotated; and
    dividing the source annotation content into a plurality of annotation contents each corresponding to a single classification.

6. An apparatus for image annotation, comprising:
    at least one processor; and
    a memory communicatively coupled to the at least one processor, configured to store instructions executable by the at least one processor;
    wherein, when the instructions are executed by the at least one processor, the at least one processor is configured to:
    obtain annotation contents of an image to be annotated;
    determine an association relationship among the annotation contents; and
    perform distribution and annotation on the image to be annotated according to the annotation contents and the association relationship;
    wherein the association relationship comprises a series relationship and a parallel relationship, and the at least one processor is further configured to:
    annotate the image to be annotated with a plurality of first annotation contents by distributing the image to be annotated to a plurality of first annotation objects, wherein an association relationship among the plurality of first annotation contents is the parallel relationship;

in response to the plurality of the first annotation contents being annotated, annotate, with a plurality of second annotation contents, the image to be annotated which carries annotation results of the respective first annotation contents by distributing the image to be annotated which carries the annotation results of the respective first annotation contents to a plurality of second annotation objects, wherein an association relationship among the plurality of second annotation contents is the parallel relationship;

wherein the plurality of first annotation contents have the series relationship with the plurality of second annotation contents, and an annotation time of the first annotation content is earlier than an annotation time of the second annotation content.

7. The apparatus of claim 6, wherein the at least one processor is further configured to:

determine an annotation classification of the respective annotation contents; and determine the association relationship among the annotation contents based on the annotation classifications of the respective annotation contents.

8. The apparatus of claim 7, wherein the at least one processor is further configured to:

in response to the annotation classifications of any two annotation contents being element position, determine that the association relationship between the two annotation contents is the parallel relationship; or, in response to the annotation classifications of any two annotation contents being element attribute, determine that the association relationship between the two annotation contents is the parallel relationship; or, determine that the annotation content with the element position as the annotation classification has the series relationship with the annotation content with the element attribute as the annotation classification.

9. The apparatus of claim 8, wherein the at least one processor is further configured to:

in response to the annotation classifications of any two annotation contents being image, determine that the association relationship between the two annotation contents is the parallel relationship; or, determine that the annotation content with the image as the annotation classification has the series relationship with the annotation content with the element position as the annotation classification; or determine that the annotation content with the image as the annotation classification has the series relationship with the annotation content with the element attribute as the annotation classification.

10. The apparatus of claim 6, wherein the at least one processor is further configured to:

obtain a source annotation content of the image to be annotated; and divide the source annotation content into a plurality of annotation contents each corresponding to a single classification.

11. A non-transitory computer-readable storage medium storing computer instructions, wherein the computer instructions are configured to cause a computer to implement a method for image annotation, the method comprises:

obtaining annotation contents of an image to be annotated;

determining an association relationship among the annotation contents; and performing distribution and annotation on the image to be annotated according to the annotation contents and the association relationship;

wherein the association relationship comprises a series relationship and a parallel relationship, and performing the distribution and annotation on the image to be annotated according to the annotation contents and the association relationship comprises:

annotating the image to be annotated with a plurality of first annotation contents by distributing the image to be annotated to a plurality of first annotation objects, wherein an association relationship among the plurality of first annotation contents is the parallel relationship;

in response to the plurality of the first annotation contents being annotated, annotating, with a plurality of second annotation contents, the image to be annotated which carries annotation results of the respective first annotation contents by distributing the image to be annotated which carries the annotation results of the respective first annotation contents to a plurality of second annotation objects, wherein an association relationship among the plurality of second annotation contents is the parallel relationship;

wherein the plurality of first annotation contents have the series relationship with the plurality of second annotation contents, and an annotation time of the first annotation content is earlier than an annotation time of the second annotation content.

* * * * *